US005172007A

United States Patent [19]

Lumetta et al.

[11] Patent Number: 5,172,007

[45] Date of Patent: Dec. 15, 1992

[54] CORROSION INHIBITING SWITCHED POLARITY FUEL LEVEL SENDER MODULE

[75] Inventors: Jeffrey J. Lumetta, Union Lake; Darryl A. Hock, Harper Woods, both of Mich.

[73] Assignee: Jabil Circuit Company, Madison Heights, Mich.

[21] Appl. No.: 685,530

[22] Filed: Apr. 15, 1991

[51] Int. Cl.[5] .......... B60L 3/00

[52] U.S. Cl. .......... 307/10.1; 340/450.2; 340/623

[58] Field of Search .......... 307/9.1, 10.1; 340/450, 340/450.2, 612, 618, 623, 624, 625; 73/113, 290 R, 291, 301, 304 R, 313

[56] References Cited

U.S. PATENT DOCUMENTS 4,412,204 10/1983 Pagane .......... 307/10.1
4,699,003 10/1987 Harde .......... 73/313
4,733,560 3/1988 Dam .......... 73/313
4,782,699 11/1988 Gonze .......... 73/308
4,789,946 12/1988 Sinz .......... 340/618
4,890,491 1/1990 Vetter et al. .......... 73/290 R
4,924,704 5/1990 Gaston .......... 340/620
4,967,181 10/1990 Iizuka et al. .......... 340/450.2

*Primary Examiner*—Jeffrey A. Gaffin
*Attorney, Agent, or Firm*—Harness, Dickey & Pierce

[57] ABSTRACT

Galvanic corrosion of the fuel sender immersed in the corrosive fuel mixture is minimized by supplying the sender with current that periodically switches polarity. The switching rate is selected to prevent or greatly minimize irreversible oxidation buildup. The vehicle body computer responds to current flow through the sender without regard to the alternating polarity drive signal. The switched polarity sender module can thus be employed without necessitating modification of the sender or body computer components.

27 Claims, 2 Drawing Sheets

EMPTY
FULL
16
14
18
20
12
22
A
B
42
IGN
28
24
26
VBC
44
46
34
48
50
32
52
VCC
40
D S Q
CLK R Q̄
10
38
30
54
56
36
IGNITION
GROUND

CORROSION INHIBITING SWITCHED POLARITY FUEL LEVEL SENDER MODULE

BACKGROUND OF THE INVENTION

The present invention relates generally to sensing of fuel level within a fuel tank. More particularly, the invention relates to an electronic circuit for minimizing corrosion of the immersed fuel sensing components by minimizing the effects of electrolysis.

In a vehicular fuel level sensing system there is a float within the fuel tank which is mechanically coupled to a fuel level sender that provides an electronic signal or condition indicative of fuel level. Typically the fuel level sender is a variable impedance device, such as a rheostat, which changes impedance as the level of the float rises and falls. In a simple system, the fuel level sender may be coupled to a fuel gage located in the passenger compartment. The current flowing through the sender is displayed on the gage to give a reading of the fuel level. In more sophisticated systems an onboard vehicle computer, sometimes called the body computer, is connected to the sender to receive data indicative of fuel level from the sender. The body computer may be programmed to provide output signals to a display in the passenger compartment for indicating fuel level as well as to provide information about fuel level for other vehicle operating purposes.

The fuel level sender of conventional design is typically in the form of an inked-on resistive trace or wire wound element placed on or secured to a plastic or other nonconductive substrate. Commonly, the sender includes silver electrodes by which the sender is electrically connected to the vehicle's electrical system and to the body computer or fuel gage. A movable wiper, also typically having a silver contact, makes sliding contact with the resistive trace in a fashion conventional to rheostats and potentiometers. The sender is typically disposed within the fuel tank in such a manner that changes in fuel level, acting through the float, change the position of the wiper with respect to the resistive trace, thereby selecting a given resistance condition which can be related to fuel level.

Because the fuel level sender is disposed inside the fuel tank, it comes into contact with the fuel stored in the tank. When using conventional gasoline fuels, the placement of the sender within the tank has not posed problems and indeed has proved beneficial since the sender components can be economically manufactured as part of the float assembly without complex mechanical linkage through the tank wall. Although suitable for conventional gasoline fuels, the above-described arrangement has proven to be quite unworkable when fuels containing a high proportion of methanol are introduced into the tank. These so-called "flexible fuels" are being developed and are under consideration to reduce hydrocarbon emissions and to reduce the consumption of petroleum-based fuels.

Many of the flexible fuels, particularly those containing methanol in high proportion, are extremely corrosive, because of the ability to absorb and mix with water. These fuels permit or faciliate electrolysis to occur at a rapid rate whereby the silver electrode material oxidizes causing the sender to fail. For example, using M85 fuel, a mixture of approximately 85% methyl alcohol and 15% gasoline. In such a u mixture, with ½% water added, the conventional fuel level sender has been seen to fail in approximately 72 hours of operation.

Prior solutions to the problem have employed circuits for applying very short duty cycle, single polarity pulses to the sender to minimize the percentage of time that current flows through the sender and to thereby minimize corrosion due to electrolysis. Current flow through the sender is sampled only during the brief pulse intervals when the short duty cycle signal is in the ON state.

While the variable duty cycle techniques can reduce corrosion due to electrolysis, we have discovered a different technique which appears to eliminate the effect of electrolysis action. In accordance with our invention a drive circuit is coupled to the fuel level sender for supplying a two polarity switched or alternating current drive signal to produce current flow through the sender which is indicative of fuel level. The presently preferred embodiment uses a 50% duty cycle switched drive signal of alternating positive and negative polarities at a frequency in the range of 100 Hz to 15 kHz. Higher switching frequencies are also possible.

Although the precise electrochemical phenomenon taking place is not fully understood, one explanation is that the use of sufficiently high frequency alternating polarity current prevents the electrically driven oxidation reaction from building up a deposit of silver oxide on the contacts and wiper. It is believed that the electrode oxidation tending to occur during the first polarity phase is reversed or inhibited during the second polarity phase. By effecting polarity reversals at a sufficiently rapid rate, oxidation is not permitted to build up on the electrodes and wiper. Although the invention appears to work over a wide frequency range, some permanent oxidation has been found to occur when polarity is switched every 20 minutes. Accordingly, we prefer to switch polarity at frequencies above 100 Hz, where little or no oxidation has been observed. Frequencies above about 15 kHz are believed to be usable as well, although in vehicular applications such frequencies can be a source of electromagnetic compatibility problems (electromagnetic interference and radio frequency interference).

In addition to being beneficial for vehicular fuel level sensing systems, the switched polarity energizing technique of the invention is more broadly applicable to energizing any immersed electrical component in a vehicular fluid system. Accordingly, the invention also comprises a method for energizing an immersed electrical component whereby a switched polarity signal is generated and delivered to the immersed electrical component as the means for delivering energy to that component. The switched polarity signal periodically alternates between a first polarity and a second polarity as more fully described herein.

For a more complete understanding of the invention, its objects and advantages, reference may be had to the following specification and to the accompanying drawings.

DESCRIPTION OF THE PREFERRED EMBODIMENT

Figure 1:
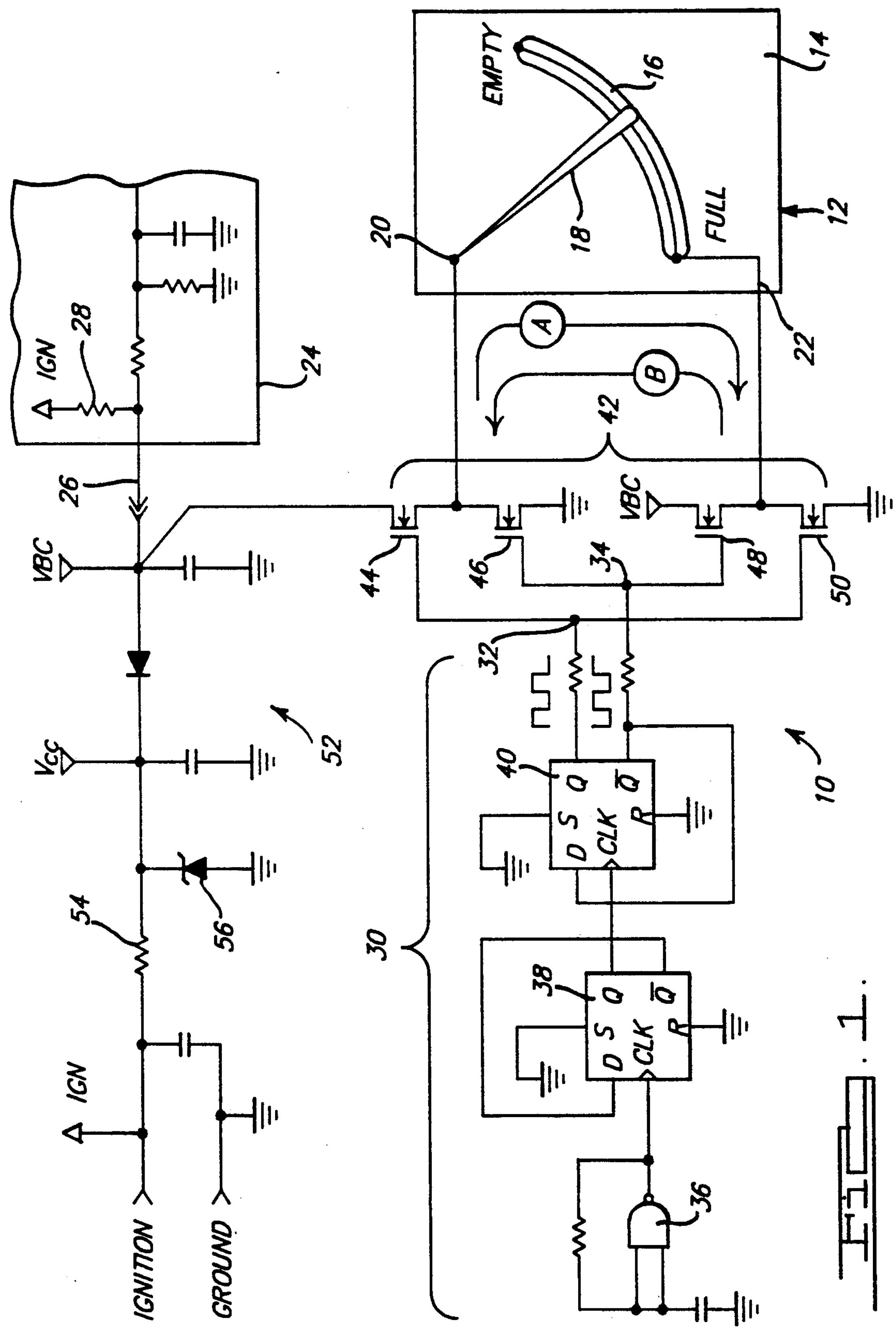
FIG. 1 is an electronic schematic diagram illustrating the presently preferred embodiment of the invention implemented in a vehicular system having a vehicular body computer.

Referring to FIG. 1, the presently preferred switched polarity sender module is depicted generally at 10. The module is designed to connect to a variable resistance fuel sender 12 of the type designed for direct immersion in the fuel tank. Although the sender can be fabricated in a variety of ways, it is essentially a rheostat. For purposes of illustration the sender has been shown as comprising a plastic or other nonconductive substrate 14, a resistive trace 16, a wiper 18 of silver or other suitable conductor and a pair of electrodes 20 and 22 of silver or other suitable conductor.

The switched polarity sender module 10 can be used with a wide variety of different vehicular fuel sensing circuits, including those using a simple fuel gage meter. However, for purposes of illustrating the invention a body computer 24 has been shown. The body computer 24 includes a data input terminal 26 which is adapted to receive an electrical signal indicative of fuel level as sensed by the sender 12. For purposes of understanding the invention in operation, a portion of the internal components of body computer 24 associated with the data input terminal 26 have been shown. Specifically, there is a pull-up resistor 28 connected to the ignition (IGN) potential.

The switched polarity sender module includes a waveform generating circuit 30 which produces a 50% duty cycle drive signal of two out of phase square waves at the output nodes 32 and 34.

The presently preferred waveform generator circuit employs an oscillator 36 which provides a suitable oscillation frequency. A pair of flip-flops 38 and 40 are used to square up the oscillating output of oscillator 36 thereby providing a 50% duty cycle. The flip-flops are edge sensing devices which produce clean, square wave output signals at the Q and NOT Q outputs. Each flip-flop produces an output frequency of 1/2 the frequency applied to its clock (CLK) terminal. Hence the output frequency of flip-flop 38 is ½ the frequency of oscillator 36 and the output frequency of flip-flop 40 is ¼ the frequency of oscillator 36. In the presently preferred embodiment two flip-flops are used because they are available in a common package and hence do not add to the cost of the circuit. The invention can, of course, be implemented using other types of waveform generation. In general, any waveform generator which produces a 50% duty cycle alternating polarity signal can be used.

The output of waveform generator 30 at nodes 32 and 34 is provided to the driver circuit shown generally at 42. Driver circuit 42 of the preferred embodiment comprises N-channel field effect transistors as switches to alternately apply current to the sender in a first direction and then in a second direction. The driver circuit transistors are connected so that the gate terminals of FETs 44 and 50 are driven by node 32 while the gate terminals of FETs 46 and 48 are driven by node 34. N-channel FETs are used in the preferred embodiment because they are presently less expensive than P-channel devices, but the invention is not limited to N-channel FETs.

The N-channel FET is turned on when the gate to source voltage is nominally a +5 volts or greater. Hence, when node 32 is driven high (+5 volts or greater) FETs 44 and 50 turn on. Because the waveform at node 34 is the inverse polarity to that of node 32, FETs 46 and 48 are turned off when FETs 44 and 50 are turned on, and vice-versa. When FETs 44 and 50 are turned on (FETs 46 and 48 off) current flows through the sender in a direction symbolized by Flow A (into electrode 20 and out from electrode 22). Conversely, when FETs 46 and 48 are on (FETs 44 and 50 off) current flow is in the direction symbolized by Flow B (in electrode 22 and out electrode 20). Thus the waveform generator circuit and driver circuit work together to comprise a means for supplying an alternating current drive signal to the fuel level sender, a signal which periodically and regularly reverses polarity at a frequency determined by the frequency of oscillator 36.

In accordance with the invention, a suitable oscillator frequency may be selected to produce the alternating current drive signal which switches polarity at a rate which minimizes or prevents electrode corrosion. In the preferred embodiment, the drive signal can oscillate between polarities at a frequency of nominally 100 Hz to 15 kHz, although there presently appears to be no limit on the upper frequency range so long as electromagnetic compatibility problems are taken into account.

Although the sender is energized using a switched polarity alternating current drive signal, the presently preferred embodiment requires no modification of the sender or body computer. The drain of FET 44 is coupled to the data input terminal 26 of the body computer and establishes the voltage VBC. This voltage is indicative of fuel level and will vary in accordance with the voltage drop across the fuel level sender. However, whereas the polarity across the fuel level sender toggles between positive and negative states, the polarity at the data input terminal 26 does not change during operation. Thus the switched polarity sender module 10 can be used to interconnect a standard sender with a standard gage or body computer without modification of those components.

Current for operating the oscillator 36 and flip-flops 38 and 40 is supplied by power supply 52, which supplies power to these components at voltage $V_{cc}$ through the conventional power supply terminals (not shown). As illustrated the power supply circuit includes a buffer resistor 54 which buffers the ignition circuit of the vehicle from the power supply. Zener diode 56, preferably having a 15 volt threshold, is employed in the circuit for transient protection. The oscillator 36 and flip-flop components 38 and 40 are preferably implemented using CMOS technology and therefore will draw very little supply current from the power supply 52. Typically these components draw less than 1 milliamp hence the voltage drop across buffer resistor 54 is typically less than 1 volt.

Figure 2:
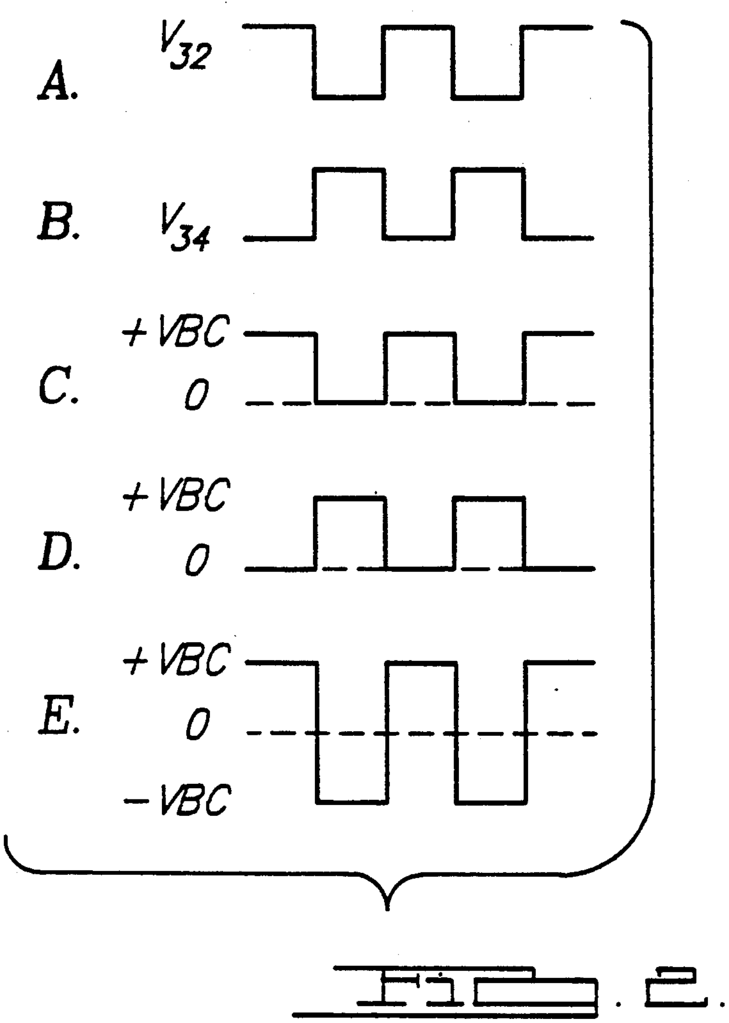
FIG. 2 is a series of voltage waveforms showing the signal timing relationships at various points within the circuit of FIG. 1.

In operation, the oscillator circuit is free-running and produces two 50% duty cycle square wave signals of opposite polarity at the nodes 32 and 34. As depicted in FIG. 2, the signal at node 32 ($V_{32}$) is opposite in polarity to the signal at node 34 ($V_{34}$). These are shown on lines A and B of FIG. 2. Also shown on FIG. 2 on line C is the voltage between electrode 20 of fuel sender and ground; and on line D the signal between electrode 22 of the sender and ground. Line E of FIG. 2 illustrates the differential voltage across the sender electrodes 20 and 22.

From FIG. 2, line E it is seen that the signal applied to the sender is an alternating signal which alternates between a positive and a negative potential. This alternating polarity or switched polarity signal provides a current flow through the sender thereby producing a voltage drop which can be read by the body computer to determine the level of fuel.

Although the voltage across the sender switches polarity on a periodic basis, the voltage VBC remains at the same polarity. The value of VBC depends on the setting of the wiper 18 with respect to the resistive trace 16. The variable impedance sender is, in effect, part of a voltage divider network with pull-up resistor 28. The voltage VBC at data input terminal 26 thus depends on the amount of resistance produced by the sender in proportion to the resistance of pull-up resistor 28. For example, if the setting of wiper 18 is such that the pull-up resistor and sender have equal resistance, then the voltage at VBC will be ½ the ignition voltage IGN. Similarly, if the wiper is positioned at the tank full position thereby creating a direct connection between electrodes 20 and 22 (0 ohms resistance), VBC at data input terminal 26 will be at ground potential. Because the fuel sender provides the same impedance or resistance value whether current flows in the A direction or in the B direction, the voltage VBC at terminal 26 does not change polarity even though the polarity of the electrodes 20 and 22 is being periodically switched.

By operating the circuit in this switched polarity alternating fashion, it has been found that the previously problematic corrosion due to electrolysis in certain corrosive fuel mixtures has been all but eliminated. The presently preferred embodiment has been tested in a 85° Fahrenheit bath of M85 fuel and it has been found that the beneficial effects of the circuit are seen at switching frequencies of 100 Hz to 15 kHz.

At some point below 100 Hz a certain degree of corrosion appears to be taking place, with the corrosion being more rapid as the frequency diminishes. For example, noticeable corrosion occurs if the circuit is switched from one polarity to the other every 20 minutes.

Although tested in the 100 to 15 kHz range, it is anticipated that the invention will work at higher switching frequencies. In vehicular applications it may be preferable to avoid higher frequencies, since these can contribute to electromagnetic interference and radio frequency interference, both which produce electromagnetic compatibility problems with other sensitive onboard electronics.

As previously noted, in its broader aspects the switched polarity techniques described in connection with a fuel level sender can be employed in many applications where galvanic corrosion is a problem. For example, the switched polarity techniques of the invention can be used to deliver energy to an immersed electrical component such as a fuel pump or a moisture detector, to name a few. Also, while switched polarity square wave signals are presently preferred, other waveforms, including sinusoidal waveforms, can be utilized.

While the invention has been described in connection with the presently preferred embodiment, certain modifications to the circuit can be made without departing from the spirit of the invention. As previously explained, the waveform generator circuit can be implemented using different components. Likewise, the driver circuit could be implemented using any device capable of switching between states in a double pole, double throw fashion. The electronic components selected for the preferred embodiment are thus not intended to be a limitation upon the scope of the invention in its broader aspects.

What is claimed is:

1. In a vehicular fuel delivery system of the type having a fuel level sender disposed at least partially within a fuel tank and having a responding means for providing an indication of fuel level in response to a signal, the improvement comprising an interface circuit coupled between the sender and the responding means for minimizing corrosion of the fuel level sender comprising:

switched polarity control circuit coupled to said sender supplying current to said sender at a polarity with periodically alternates between a first polarity and a second polarity; and means coupled to said control circuit for providing a signal to said responding means based on the amount of current drawn by said sender from said control circuit.

2. The interface circuit of claim 1 wherein said control circuit includes an oscillator means for producing a periodically alternating condition for controlling the polarity of said current.

3. The interface circuit of claim 1 wherein said control circuit includes a waveform generating circuit for producing at least one periodically alternating signal for controlling the polarity of said current.

4. The interface circuit of claim 1 wherein said control circuit includes a waveform generating circuit for controlling the polarity of said current, said waveform generating circuit producing a first periodically alternating signal and a second periodically alternating signal of phase opposite to said first periodically alternating signal.

5. The interface circuit of claim 1 wherein said control circuit includes a driver circuit coupled to said sender and to said responding means for selectively coupling said sender and said responding means in a first polarity state and in a second polarity state.

6. The interface circuit of claim 1 wherein said control circuit supplies current to said sender by establishing a current flow between said sender and said responding means.

7. The interface circuit of claim 1 wherein said current periodically alternates at nominally a fifty percent (50%) duty cycle.

8. The interface circuit of claim 1 further comprising means for establishing conduction between said sender and said responding means.

9. A fuel level sensing system for use in a vehicular fuel tank comprising:

a sender means disposed in said tank having a variable impedance means for responding to the level of fuel in the tank;

a switched polarity means coupled to said sender means for supplying current to said sender means at a polarity which periodically alternates between a first polarity and a second polarity;

said variable impedance means establishing the amount of said current in accordance with the level of fuel in the tank;

a responding means coupled to said sender means for providing an indication of fuel level in accordance with the amount of said current established by said variable impedance means.

10. The interface circuit of claim 9 wherein said switched polarity means includes an oscillator means for producing a periodically alternating condition for controlling the polarity of said current.

11. The interface circuit of claim 9 wherein said switched polarity means includes a waveform generating circuit for producing at least one periodically alterating signal for controlling the polarity of said current.

12. The interface circuit of claim 9 wherein said switched polarity means includes a waveform generating circuit for controlling the polarity of said current, said waveform generating circuit producing a first periodically alternating signal and a second periodically alternating signal of phase opposite to said first periodically alternating signal.

13. The interface circuit of claim 9 wherein said switched polarity means includes a driver circuit coupled to said sender and to said responding means for selectively coupling said sender and said responding means in a first polarity state and in a second polarity state.

14. The interface circuit of claim 9 wherein said switched polarity means supplies current to said sender by establishing a current flow between said sender and said responding means.

15. The interface circuit of claim 9 wherein said current periodically alternates at nominally a fifty percent (50%) duty cycle.

16. The interface circuit of claim 9 further comprising means for establishing conduction between said sender and said responding means.

17. In a vehicular fluid system of the type having at least one immersed electrical component, a method of energizing the electrical component to minimize galvanic corrosion comprising:

generating a switched polarity signal which periodically alternates between a first polarity and a second polarity; and using said switched polarity signal to deliver energy to said immersed electrical component.

18. The method of claim 17 wherein said switched polarity signal alternates between polarities at nominally a fifty percent (50%) duty cycle.

19. The method of claim 17 further comprising generating a first periodically alternating signal and a second periodically alternating signal of phase opposite to said first periodically alternating signal and using said first and second periodically alternating signals to deliver energy to said immersed electrical component.

20. The method of claim 17 wherein said immersed electrical component is a level sender and said method further comprises using said switched polarity signal to deliver energy to said level sender.

21. The method of claim 17 further comprising using said switched polarity signal to establish current flow through said immersed electrical component.

22. The method of claim 17 wherein said switched polarity signal is generated by producing an oscillating signal at a predetermined frequency and by generating at least one square wave signal based on said oscillating signal.

23. The method of claim 17 wherein said switched polarity signal is generated by producing an oscillating signal at a predetermined frequency and by generating a pair of square wave signals based on said oscillating signal.

24. The method of claim 23 wherein said pair of square wave signals are out of phase with one another.

25. The method of claim 23 wherein said pair of square wave signals are one hundred eighty degrees (180° ) out of phase with one another.

26. The method of claim 17 wherein said switched polarity signal is generated by producing an oscillating signal at a predetermined frequency and by generating at least one fifty percent (50%) duty cycle square wave signal based on said oscillating signal.

27. The method of claim 17 wherein said switched polarity signal is generated by producing an oscillating signal at a predetermined frequency and by generating a pair of fifty percent (50%) duty cycle square wave signals based on said oscillating signal.

* * * * *

UNITED STATES PATENT AND TRADEMARK OFFICE

CERTIFICATE OF CORRECTION

PATENT NO. : 5,172,007

DATED : December 15, 1992

INVENTOR(S) : Jeffrey J. Lumetta et al.

It is certified that error appears in the above-identified patent and that said Letters Patent is hereby corrected as shown below:

Column 6, line 11, Claim 1, after "sender" insert – for –.

Column 6, line 12, Claim 1, delete "with" and insert – which –.

Column 7, lines 3 and 4, Claim 11, delete "alterating" and insert – alternating –.

Signed and Sealed this

Ninth Day of November, 1993

Attest:

BRUCE LEHMAN

*Attesting Officer* *Commissioner of Patents and Trademarks*